Patented Aug. 14, 1951

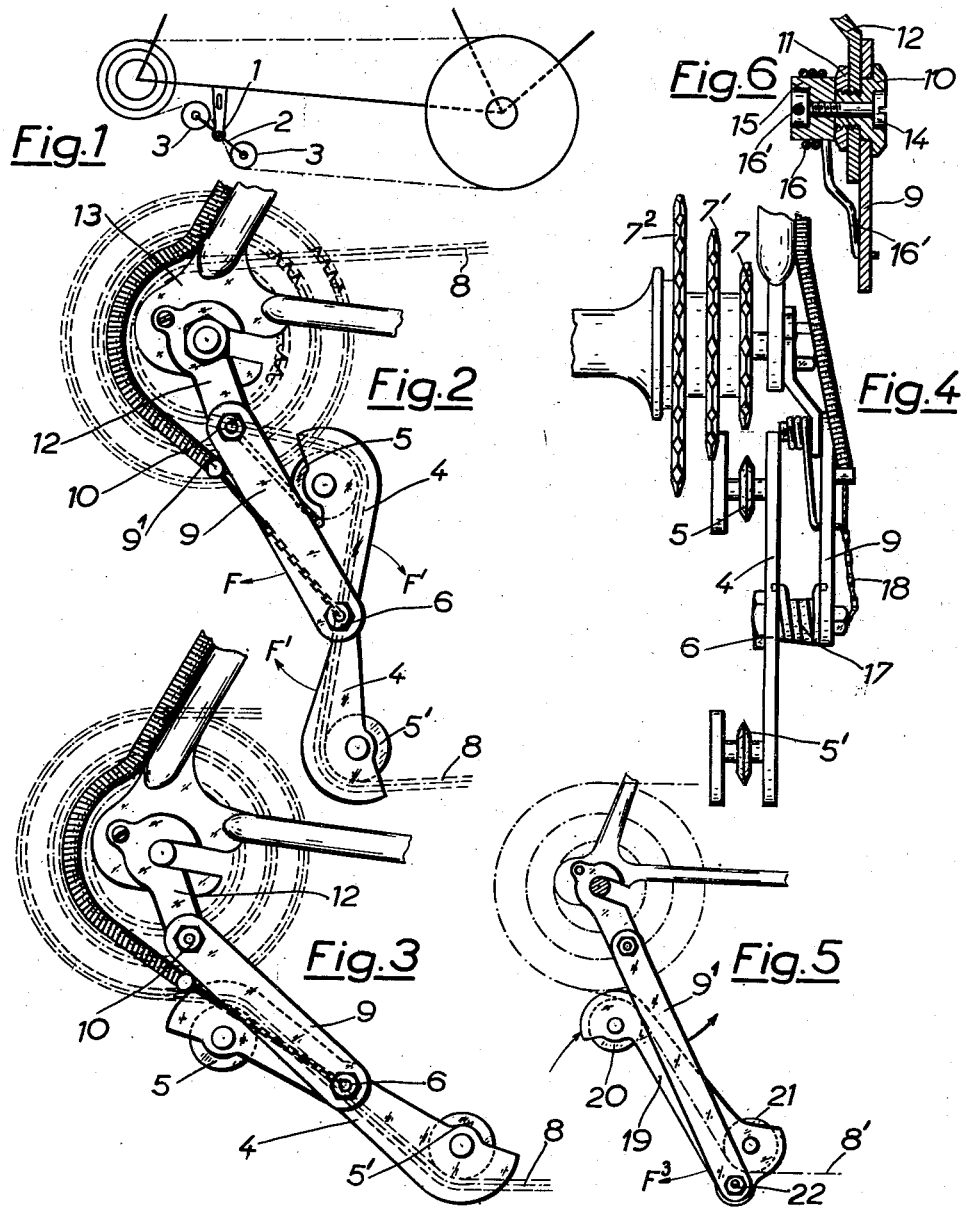

2,564,576

UNITED STATES PATENT OFFICE 2,564,576

VARIABLE-SPEED GEAR FOR BICYCLES, TANDEMS, AND THE LIKE

Lucien Charles Hippolyte Juy, Dijon, France

Application March 11, 1947, Serial No. 733,967
In France September 28, 1945

Section 1, Public Law 690, August 8, 1946
Patent expires September 28, 1965

6 Claims. (Cl. 74—217)

In the existing dérailleur-type variable-speed gears for bicycles, tandems and the like, one kind known as the "double-turn" kind, comprises a fixed point 1 supporting a selector pin on which is mounted a rocking lever 2 having at each extremity a tensioning pinion or roller 3 (Figure 1).

It is an object of the present invention to provide an improved gear of this kind in which removal of the rear wheel carrying the stepped pinions is considerably facilitated and in which the tension of the chain does not vary with the diameter of the engaged pinion, an effect which is common to existing gears of this kind and which produces a difference in the output of the gear according to the speed selected.

In accordance with the present invention, a dérailleur-type variable speed gear comprises an automatic tension-compensating device for providing a maximum arc of contact of the chain with the engaged pinion by a combined automatic action provided by an arm rockably mounted on a fixed pivot on the frame and carrying at its free end a rockable lever having rollers or pinions for guiding and supporting the chain, the said arm and the lever being each independently urged in the required direction by a spring.

In order that the invention may be clearly understood and readily carried into effect, the same will hereinafter be more fully described with reference to the accompanying drawings, in which:

Figure 1 shows diagrammatically the known double-turn dérailleur-type gear, in which the rocking lever and associated pinions or rollers rock about a fixed point in order to ensure the tension of the chain;

Figure 2 is a diagrammatic external view of an embodiment of the present invention, the parts being in the position in which the chain is in engagement with the small pinion, that is to say, in top gear;

Figure 3 is a view similar to Figure 2 with the parts in the position in which the chain is in engagement with the large pinion, that is to say, in bottom gear;

Figure 4 is a diagrammatic end view of Figure 2;

Figure 5 shows diagrammatically a modified embodiment of the invention; and

Figure 6 is a detail sectional view showing the attachment of the tension spring of the moving arm.

Referring now to the drawings, which show only those parts of the gear which are essential to a clear understanding of the invention, the variable-speed gear embodying the present invention comprises essentially a rocking lever 4 which receives its transverse movement from a reciprocating device of known kind, and which is pivoted at 6 in order to ensure firstly that the roller 5 provides a sufficient arc of contact of the chain 8 with the pinion 7, and secondly that the roller $5^1$ produces the desired tensioning of the slack side of the chain 8.

The pivot 6 is itself carried by an arm 9 rockably mounted on a shouldered screw 10 fixed by a nut 11 on a bracket 12 secured to or integral with the rear bracket 13 of the frame. The shouldered screw 10 serves to support freely an axial screw 14 which is threaded into the end of a drum 15 on which is supported and wound a coiled spring 16, the fixed end of the spring engaging the drum 15 as at 16' and the other end $16^2$ engaging the arm 9.

From the foregoing it will readily be understood that by turning the axial screw 14 to produce the rotation of the drum 15 the tension of the spring 16 is adjusted, this operation being carried out without locking the arm 9, which remains free on the shouldered screw 10. The spring 16 therefore acts in the direction of the arrow F (Figure 2) and tensions the moving arm 9 in the rearward direction.

In its turn, the lever 4 is urged in the direction of the arrow $F^1$ by the action of a spiral spring 17, one end of which is hooked over said lever 4 while the other is hooked to the moving arm 9. The lever 4 and spring 17 are supported by the hollow pivot 6, the lever being connected to a control chain 18 which passes through the pivot 6 and is attached to a Bowden cable the sheath of which is anchored to a pin 9' on the arm 9. The pivot of the arm 9 therefore forms an axis which is parallel to the axis of the rear road wheel carrying the stepped pinions and may even be coincident therewith. If this should not be the case, as in Figures 2, 3 and 4, the pivot 10 is adjacent to the road wheel axis and is secured to the rear bracket 13 of the frame by a fixed bracket 12 of known kind.

It will be evident that the individual adjustment of the springs 16, 17, which are freely mounted respectively on the pivots 10 and 6, the spiral spring 17 ensuring rotation of the lever 4 about the pivot 6, permits the tension of the chain 8 to be increased if the tension of the coiled spring 16 is increased with respect to that of the spiral spring 17, and inversely the tension of the chain 8 to be reduced and the arc of contact of the chain 8 on the engaged pinion increased if the tension of the spring 17 is increased with respect to that of the spring 16. This regulation may be obtained by, for example, selection of the length of the respective arms of the lever 4, the disposition of said arms with respect to one another, the length of the arm 9, the angles at which the springs are secured, and the diameters and quality of the spring wire, so as to achieve the desired result to the fullest possible extent. The tension of the springs 16 and 17 may also be regulated by known means, such as adjusting screws or engaging the spring ends in notches, teeth or the like.

As will be seen from the foregoing, the tension on the slack side of the chain 8 may be varied as desired by adjusting the tension of the conical spring 17, while the arc of contact of the chain 8 with the engaged pinion may be varied by adjusting the tension of the coiled spring 16. This regulation is very important when pinions of very small diameter are employed. The combination of the regulation in the tension of these two springs thus allows for sufficient "slack" in the chain 8 without any danger of accidental jumping of the chain, while providing a sufficient arc of contact to prevent the chain from running over the teeth when the smaller pinions are being used.

In the modification shown in Figure 5, a rockable lever 19 having unequal arms is employed, the fulcrum 22 of which is so located on the moving arm 9¹ that the tension in the direction of the arrow F³ itself determines the arc of contact of the chain 8¹, the roller 20 being placed under pressure by reaction of the roller 21, thereby enabling the spring 17 to be dispensed with or its tension to be reduced.

With either of these arrangements, removal of the rear wheel is facilitated, since when it is pulled forward the arm 9 is inclined to the rear by its spring, whereby the mechanism is disengaged and the chain is held in position ready for re-assembly.

I claim:

1. In a variable speed gear for cycles and the like vehicles including chain driven sprocket wheels on the rear wheel, the combination of a bracket rigid with the vehicle frame in the vicinity of the rear wheel axis, a pivot on said bracket, an arm pivotally secured to said pivot, a lever pivotally secured to the free end of said arm, chain rollers adapted to engage the driving chain and pivotally carried by the lever at the corresponding ends of the latter, a spring connecting the arm near its pivot with said pivot for urging the outer end of the arm in a chain tensioning direction and means for adjusting the tension of said spring.

2. In a variable speed gear for cycles and the like vehicles including chain driven sprocket wheels on the rear wheel, the combination of a bracket rigid with the vehicle frame in the vicinity of the rear wheel axis, a pivot on said bracket at a distance from the axis of the sprocket wheels smaller than the radius of the larger sprocket wheel, an arm pivotally secured to said pivot, a lever pivotally secured to the free end of said arm, chain rollers adapted to engage the driving chain and pivotally carried by the lever at the corresponding ends of the latter, a spring connecting the arm near its pivot with said pivot for urging the outer end of the arm in a chain tensioning direction and means for adjusting the tension of said spring.

3. In a variable speed gear for cycles and the like vehicles including chain driven sprocket wheels on the rear wheel, the combination of a bracket rigid with the vehicle frame in the vicinity of the rear wheel axis, a pivot on said bracket, an arm pivotally secured to said pivot, a lever pivotally secured to the free end of said arm, chain rollers adapted to engage the driving chain and pivotally carried by the lever at the corresponding ends of the latter, a spring connecting the arm near its pivot with said pivot for urging the outer end of the arm in a chain tensioning direction and a further spring connecting the lever with a point on the arm for urging the lever in a chain releasing direction.

4. In a variable speed gear for cycles and the like vehicles including chain driven sprocket wheels on the rear wheel, the combination of a bracket rigid with the vehicle frame in the vicinity of the rear wheel axis, a pivot on said bracket, an arm pivotally secured to said pivot, a lever pivotally secured to said pivot, a lever pivotally secured to the free end of said arm, chain rollers adapted to engage the driving chain and pivotally carried by the lever at the corresponding ends of the latter, a spring connecting the arm near its pivot with said pivot for urging the outer end of the arm in a chain operating direction, another spring connecting the lever with a point of the arm for urging the lever in a chain operating reaction opposed to the last mentioned direction and means for adjusting the tension of at least one spring.

5. In a variable speed gear for cycles and the like vehicles including chain driven sprocket wheels on the rear wheel, the combination of a bracket rigid with the vehicle frame in the vicinity of the rear wheel axis in a direction substantially radial with reference to said wheel axis, a pivot on said bracket, an arm pivotally secured to said pivot, a lever pivotally secured to the free end of said arm, chain rollers adapted to engage the driving chain and pivotally carried by the lever at the corresponding ends of the latter, a spring connecting the arm near its pivot with said pivot for urging the outer end of the arm in a chain tensioning direction and a further spring connecting the lever with a point on the arm for urging the lever in a chain releasing direction and means for adjusting separately said two springs.

6. In a variable speed gear for cycles and the like vehicles including chain driven sprocket wheels on the rear wheel, the combination of a bracket rigid with the vehicle frame in the vicinity of the rear wheel axis, a pivot on said bracket, an arm pivotally secured to said pivot, a lever pivotally secured to the free end of said arm, chain rollers adapted to engage the driving chain and pivotally carried by the lever at the corresponding ends of the latter, a spring connecting the arm near its pivot with said pivot for urging the outer end of the arm in a chain tensioning direction and a further spring connecting the lever with a point of the arm for urging the lever in a chain releasing direction, and means for adjusting separately said two springs.

LUCIEN CHARLES HIPPOLYTE JUY.

REFERENCES CITED

The following references are of record in the file of this patent:

UNITED STATES PATENTS

| Number | Name | Date |
|---|---|---|
| 2,108,941 | Morgan | Feb. 22, 1938 |

FOREIGN PATENTS

| Number | Country | Date |
|---|---|---|
| 742,354 | France | Dec. 27, 1932 |
| 440,377 | Great Britain | Dec. 30, 1935 |
| 615,139 | France | July 16, 1946 |